(12) United States Patent
Grimminger et al.

(10) Patent No.: US 11,673,647 B2
(45) Date of Patent: Jun. 13, 2023

(54) SYSTEM FOR DRIVING A FLAP ARRANGEMENT BETWEEN A RETRACTED POSITION AND AN EXTENDED POSITION

(71) Applicant: Airbus Operations GmbH, Hamburg (DE)

(72) Inventors: Andreas Grimminger, Hamburg (DE); Markus Gibbert, Hamburg (DE); Bernhard Schlipf, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 34 days.

(21) Appl. No.: 17/366,347

(22) Filed: Jul. 2, 2021

(65) Prior Publication Data
US 2021/0331782 A1    Oct. 28, 2021

Related U.S. Application Data

(63) Continuation of application No. 16/507,758, filed on Jul. 10, 2019, now Pat. No. 11,077,933.

(30) Foreign Application Priority Data

Jul. 12, 2018    (DE) .......................... 102018116881.0

(51) Int. Cl.
   *B64C 9/24*      (2006.01)
   *B64C 13/28*     (2006.01)

(52) U.S. Cl.
   CPC ................ *B64C 9/24* (2013.01); *B64C 13/28* (2013.01)

(58) Field of Classification Search
   CPC .. B64C 9/24; B64C 13/28; B64C 9/22; B64C 9/02; B64C 3/50
   See application file for complete search history.

(56) References Cited

U.S. PATENT DOCUMENTS

3,504,870 A * 4/1970 Weiland ................... B64C 3/48
                                                      244/210
3,910,530 A * 10/1975 James ....................... B64C 9/22
                                                      244/214
(Continued)

FOREIGN PATENT DOCUMENTS

DE   102011018906 A1   10/2012
EP      2032434 B1      6/2010
EP      2509859 B1      5/2014

OTHER PUBLICATIONS

German Search Report; priority document.

*Primary Examiner* — Brady W Frazier
(74) *Attorney, Agent, or Firm* — Greer, Burnss & Crain, Ltd.

(57) ABSTRACT

A flap system driving a leading-edge flap between retracted and extended positions comprises a leading-edge flap having first and second flap joints, first and second scissor links, a first connecting link, and an actuator. The actuator couples with either the first scissor link or first connecting link. The first scissor link is rotatable supported on a first fixed point by a first support joint. An end of the first scissor link opposite the first support joint couples with the first flap joint. The first connecting link is rotatably supported on a second fixed point by a second support joint. An end of the first connecting link opposite the second support joint rotatably couples with an end of the second scissor link. An opposite end of the second scissor link couples with the second flap joint. The first and second scissor links are rotatably coupled to form a scissor arrangement.

20 Claims, 3 Drawing Sheets

(56) References Cited

U.S. PATENT DOCUMENTS

| | | | | |
|---|---|---|---|---|
| 3,994,451 | A * | 11/1976 | Cole | B64C 3/48 |
| | | | | 244/214 |
| 4,159,089 | A * | 6/1979 | Cole | B64C 9/24 |
| | | | | 244/214 |
| 7,270,305 | B2 * | 9/2007 | Rampton | B64C 9/22 |
| | | | | 244/214 |
| 7,578,484 | B2 * | 8/2009 | Fox | B64C 9/22 |
| | | | | 244/214 |
| 8,596,586 | B2 | 12/2013 | Schroeder | |
| 9,656,739 | B2 | 5/2017 | Hue et al. | |
| 2017/0283039 | A1 * | 10/2017 | McCormick | B64C 9/22 |
| 2020/0017193 | A1 * | 1/2020 | Grimminger | B64C 13/28 |

* cited by examiner

SYSTEM FOR DRIVING A FLAP ARRANGEMENT BETWEEN A RETRACTED POSITION AND AN EXTENDED POSITION

CROSS-REFERENCES TO RELATED APPLICATIONS

This application claims the benefit of the German patent application No. 102018116881.0 filed on Jul. 12, 2018, and is a continuation of U.S. Ser. No. 16/507,758, filed Jul. 10, 2019, the entire disclosures of which are incorporated herein by way of reference.

FIELD OF THE INVENTION

The invention relates to a system for driving a flap arrangement between a retracted position and an extended position, a wing having such a system as well as an aircraft.

BACKGROUND OF THE INVENTION

In commercial aircraft, often so-called high lift systems are provided on a wing permitting an increase of a lift generating area of the wing, as well as its camber. Predominantly, these high lift systems comprise a trailing edge flap arrangement and a leading edge flap arrangement. For example, a leading edge flap arrangement comprises a flap that is extended from a recess at an underside of the wing into a position upstream of the wing. For this so-called Krüger flap, numerous different actuation mechanisms exist.

A Krüger flap is usually stored at an underside of the wing with the trailing edge pointing in a forward direction and the leading edge pointing backwards. During the deployment of the flap, it roughly follows a rotary motion to reach a position in front of a leading edge of the wing under creation of a gap thereto, wherein the leading edge of the flap points in the flight direction and wherein the trailing edge points in a rearward direction.

DE102011018906A1 exemplarily shows a leading edge flap system with a Krüger flap. Here, an additional holding element is attached to a trailing edge of the flap to influence the gap between the flap and the leading edge of the wing.

EP2509859B1 shows a high lift system, which may also comprise a Krüger flap, which has a certain design to shape the resulting gap between the flap and the leading edge of the wing to be strictly convergent.

SUMMARY OF THE INVENTION

Common kinematics for extending leading-edge slats in the form of Krüger flaps often provide a strict motion of the leading-edge flap attached to a lever, which swivels around a rotational axis. Hence, the angle between a chord axis of the flap and a chord axis of the wing is substantially proportional to the position of the lever. It may, however, be advantageous to provide a different motion to optimize a gap between the leading-edge flap and the leading edge of the wing, as well as the air flow over the flap and the wing.

Therefore, it is an object of the invention to propose an improved flap system for providing a motion of a leading-edge flap, which improves the flow in the flap region, while the system shall be as simple as possible.

A flap system for driving a leading-edge flap between a retracted position and an extended position is proposed, the system comprising a leading-edge flap having a first flap joint and a second flap joint, a first scissor link, a second scissor link, a first connecting link, and an actuator, wherein the actuator is coupled with either the first scissor link or the first connecting link, wherein the first scissor link comprises a first support joint for rotatably supporting the first scissor link on a first structurally fixed point, wherein an end of the first scissor link opposed to the first support joint is coupled with the first flap joint, wherein the first connecting link comprises a second support joint for rotatably supporting the first connecting link on a second structurally fixed point and wherein an end of the first connecting link opposed to the second support joint is rotatably coupled with an end of the second scissor link, and wherein an end of the second scissor link opposed to the end coupled with the first connecting link is coupled with the second flap joint, wherein additionally the first scissor link and the second scissor link are rotatably coupled to each other to form a scissor arrangement, and wherein the actuator, the first scissor link, the second scissor link and the first connecting link are arranged to actively place the leading-edge slat from a retracted position into an extended position.

The major advantage of the flap system according to the invention lies in eliminating a proportional or strict coupling of an angle of the leading-edge flap and the deployment state of the flap. The scissor arrangement, which is coupled with the first structurally fixed point on only one end of one of the scissor links will be rotated around the first structurally fixed point and will change the angle between the flap and the wing chord up to a certain relation between a rotational position of the scissor arrangement and its closing state. This may be considered an intermediate position. In this regard, the scissor arrangement is "closed" if the scissor links substantially do not enclose an angle and are positioned flush on each other. The closing state is to be considered the degree about which the scissor arrangement is closed. After reaching the intermediate position, the flap angle may remain substantially constant or change only slightly. This means that a desired deployment angle of the flap may be almost reached before the flap is completely deployed. After that, the flap may provide a substantially translational motion. This improves the shape of the gap in an earlier stage of deployment than with common Krüger flap arrangements.

The main flap may be a flow body having an elongate shape as well as a leading edge and a trailing edge. It may be curved in a similar way to a common Krüger flap or another type of flow influencing control surface of an aircraft. The main flap is a leading-edge flap intended to be moved relative to a leading edge of a wing. In a retracted state, the flap is arranged in a recess at an underside of the wing. The motion mentioned in this application relates to a deployment motion from the recess into a position forward the leading edge of the wing.

The flap system according to the invention is based on a scissor arrangement made of two scissor links, wherein one of these is rotatably supported on a structurally fixed point and wherein the other one is supported on a first connecting link. The first connecting link in turn is rotatably connected to another structurally fixed point. By moving the first connecting link, an end of the second scissor link is rotated around the first structurally fixed point. Depending on the length of the first connecting link, the distance of the first structurally fixed point and the second structurally fixed point as well as the dimensions of both scissor links, a motion of the flap results. In the following, the components are described in more detail.

The actuator may be a rotary actuator, which is exemplarily directly coupled with the first connecting link. The actuator may also be coupled with a structurally fixed point in an installed state on the wing. By rotating the actuator, the first connecting link is rotated around the second structurally fixed point and thereby moves the second scissor link. However, the actuator may also be coupled with the first scissor link and a structurally fixed point in order to swivel the first scissor link on a circular path.

The first scissor link comprises two ends, wherein one of the ends is rotatably coupled with the first structurally fixed point. Resultantly, the first scissor link is able to swivel around the first structurally fixed point. The end of the first scissor link opposed to the first structurally fixed point is coupled with the first flap joint. By this, the first scissor link is not necessarily directly coupled with the first flap joint. Instead, also an intermediate part or component may be provided between the first flap joint and the first scissor link.

The second scissor link also comprises two ends, wherein one of the ends is rotatably coupled with the first connecting link and wherein the other end is rotatably coupled with the second flap joint. Hence, the second scissor link is able to swivel around the end of the first connecting link that is opposed to the end that is coupled with the first structurally fixed point. Hence, when the first connecting link swivels through an action of the actuator, the second scissor link is also urged into a motion.

Both scissor links are equipped with a further joint, which will be referred to as a scissor joint. The scissor joint is arranged in a region between both ends of each one of the scissor links and leads to the creation of the scissor arrangement. This means that both scissor links cross each other and can assume different angles relative to each other.

By moving the first connecting link resultantly the whole scissor arrangement is urged to rotate around an end of the first scissor link that is rotatably coupled with the first structurally fixed point. The dimensional relations between the links and their couplings determine the resulting motion of the scissor links, i.e., the angle between both scissor links and the rotation of the first scissor link around its inner end that is coupled with the first structurally fixed point. Consequently, the flap system according to the invention may be adjusted in such a way that a leading edge of the flap is in a relatively far forward position even with the trailing edge of the flap being underneath a chord line of the wing, to which the flap system is attachable. Hence, the gap between the flap and the leading edge of the wing can be reached with the flap still just being below the wing chord line in the intermediate position. The subsequent motion of the flap to the fully extended position maintains a certain gap dimension while the position of the flap changes to the desired extended position. This may include a slight backward motion as well as a slight further rotation.

In a preferred embodiment, the first scissor link is coupled with the flap through a second connecting link, which is rotatably supported to the first scissor link and the first flap joint. This enables the flap angle to remain substantially constant in a certain deployment state range. Preferably, the second connecting link has a shorter length than the first connecting link. Particularly, the second connecting link is clearly shorter than the first connecting link and comprises a length that equals a third of the length of the first connecting link, or less. This may increase the compactness of the flap system in general, as with rather larger angles between the scissor links the leading-edge flap snugly fits at an underside of the wing with all links folded onto or into each other. Still further, the flap system allows an overlocking of the second connecting link, which ensures that the flap fulfils a more translational movement rather than a more rotational movement from an intermediate position to a final fully deployed setting.

Preferably, one of the first scissor link and the second scissor link comprises a recess along a main extension direction, through which the other one of the first scissor link and the second scissor link passes, and wherein the first scissor link and the second scissor link are rotatably coupled in a region of the recess. The recess may exemplarily comprise the shape of a slot or a slit and may extend through a substantial part of the respective scissor link. A substantial part of the respective scissor link may consequently be designed in the form of a fork head with the two limbs of the fork head enclosing a gap, through which the other one of the scissor links extends. In the space between the limbs, a joint for coupling the scissor links may be arranged.

The first scissor link and the second scissor link each may comprise a scissor joint for coupling the first scissor link and the second scissor link, wherein the scissor joint is placed in a central region of each scissor link. The term "central region" is to be understood as a region of the respective link, which is placed between both ends and extends along approximately 50% of the individual scissor link length in total, i.e., along approximately 25% of the respective length from the center of the link into both directions. The scissor joint may be arranged at any point of this central region. The dimensional relations relate to the center axis of the scissor joint.

In a preferred embodiment, the second scissor link is directly coupled with the second flap joint. By directly coupling the second scissor link with the flap, i.e., in a rotatable manner, the second flap joint exclusively moves through the motion of the second scissor link. Hence, further guides, such as a linear guide, is not required. This simplifies the mechanical design of the system according to the invention.

Also, exclusively a single actuator may be used. Hence, the advantages of the flap system can be achieved by moving only one of the links without having to utilize a second actuator for, e.g., changing an angle or translational position of the flap in relation to the wing, to which the flap system is installed. The flap system according to the invention is simple, yet efficient to provide the desired motion of the flap.

Preferably, the actuator, the first scissor link, the second scissor link and the first connecting link are arranged to actively place the leading-edge flap from a retracted position into an intermediate position, in which a chord axis of the flap is adjusted to a desired angle, and to provide a substantially translational motion afterwards along the chord axis of the flap, while the orientation of the chord axis substantially remains constant or increases slightly, for example about 10-15°. Hence, all of the links used in the flap system are to be designed in a manner so that this behavior can be achieved. Hence, the flap as presented in the above description will be moved to a forward position, in which the local flap chord has assumed a desired angle just before the local chord axis of the wing is reached. Afterwards, the flap may be moved substantially translational along the chord axis with a certain gap between the leading edge of the wing and the leading edge flap into the fully extended position.

As stated further below, the certain angle in the intermediate position may be approximately 117°. In the extended position the angle may be approximately 130°. However, these angles may vary slightly, for example about +/−2°.

The invention further relates to a wing having a leading edge region and a trailing edge region as well as at least one flap system according to the above description.

Advantageously, the system is arranged in the leading edge region.

Preferably, the flap system is designed to move the flap to an intermediate position below a wing leading edge point up to an angle of 117° between a local flap chord and a local wing chord. This prevents a flow separation on an upper side of the wing. The position of the flap just below the wing leading edge point is considered the intermediate position mentioned above and further below.

In the subsequent extension from the intermediate to the extended position, the local flap chord reaches an angle of exemplarily 130° to the local wing chord. The flap then has moved in a substantially translational motion along the leading edge of the wing under maintaining the gap.

The flap system is further designed to limit a gap between a trailing edge of the flap and a leading edge point of the wing to 2% of the local wing cord. This harmonizes a flow from the flap to an upper side of the wing. The gap between the trailing edge of the flap and the wing leading edge should not be greater than 2% of the local wing chord. This prevents a flow separation on the wing during the deployment of the flap. This may include the intermediate position. Also, this may include the extended position.

Finally, the invention relates to an aircraft having at least one such wing.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION OF EXEMPLARY EMBODIMENTS

Figure 1:
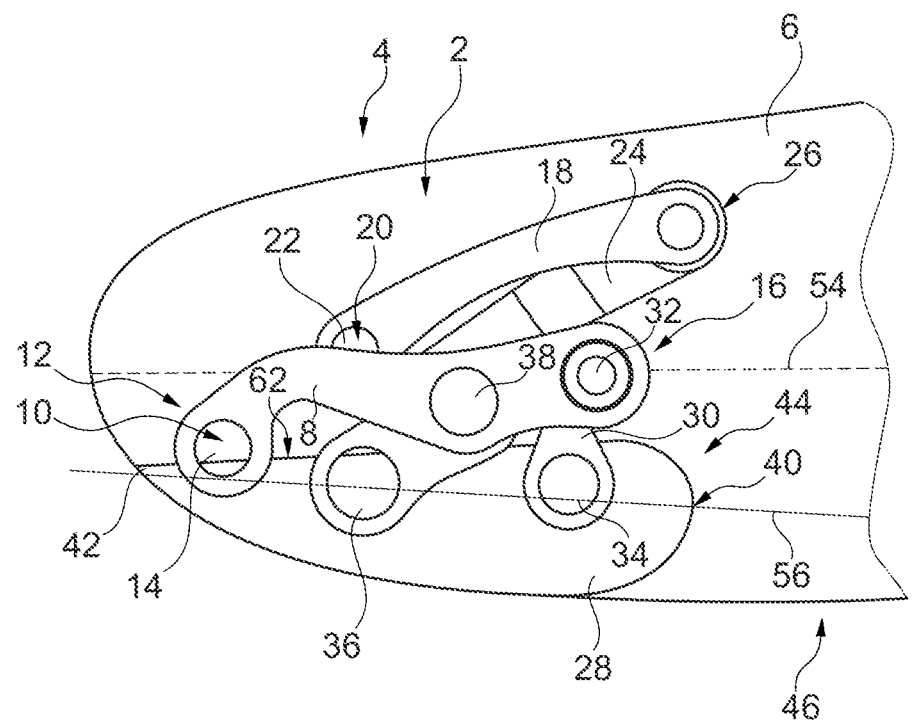
FIG. 1 shows a flap system according to the invention in a retracted state at a leading edge of a wing in a schematic lateral view.

FIG. 1 shows a flap system 2 installed in a leading-edge region 4 of a wing 6. The flap system 2 comprises a first scissor link 8, which is swivably or rotatably mounted on a first structurally fixed point 10. For example, an inner end 12 of the first scissor link 8 comprises a rotary joint 14, which is connected to the first structurally fixed point 10 of the wing 6. The first scissor link 8 further comprises an outer end 16, which is opposed to the first end 12.

The flap system 2 further comprises a first connecting link 18, which is swivably or rotatably mounted on a second structurally fixed point 20. For this purpose, the first connecting link 18 comprises a rotary joint 22.

The first connecting link 18 and the first scissor link 8 are coupled through a second scissor link 24. An outer end 26 of the first connecting link 18 is rotatably coupled with the second scissor link 24, which is placed at an end of the second scissor link 24. The other end, which is opposed thereto, is rotatably coupled with a flap 28. The outer end 16 of the first scissor link 8 in turn is coupled with a second connecting link 30 through a rotary joint 32. An end of the second connecting link 30, which is opposed thereto, is coupled with the flap 28 through a further rotary joint 34. In the following, the connection point of the second connecting link 30 with the flap 28 is named first flap joint 34. In analogy thereto, a rotary joint 36 between the second scissor link 24 and the flap 28 is the second flap joint 36.

Still further, the first scissor link 8 and the second scissor link 24 comprise a scissor joint 38, through which both scissor links 8 and 24 are swivably supported relative to each other.

FIG. 1 shows the flap 28 in a completely retracted position. Here, a leading edge 40 of the flap 28 is in a rearward position, while the trailing edge 42 of the flap 28 is in a forward position. The flap 28 provides a continuous surface with the surrounding parts of the wing 6. For this purpose, the wing 6 comprises a recess 44 at its underside 46.

Figure 2:
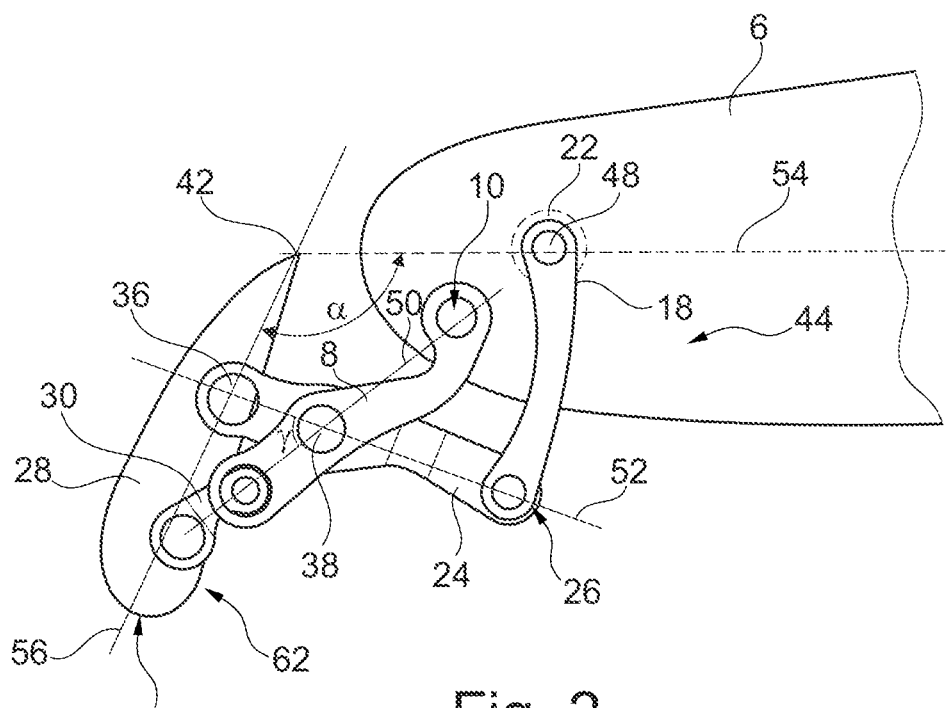
FIG. 2 shows a flap system according to the invention in an intermediate state at a leading edge of a wing in a schematic lateral view.

When moving the flap system 2 according to FIG. 2, an actuator 48, which is exemplarily indicated at the second structurally fixed point 22, is operated so that the first connecting link 18 moves in a clockwise direction. The outer end 26 of the first connecting link 18 thereby pushes the second scissor link 24 in a forward direction. In doing so, the second flap joint 36 is also moved in a forward direction. Due to the support on the first structurally fixed point 10, the first scissor link 8 follows the motion of the second scissor link 24, since both scissor links are connected to each other through the scissor joint 38. An angle γ between an extension 50 of the first scissor link 8 and an extension 52 of the second scissor link 34 decreases with increasing motion of the first connecting link 18. In the position shown in FIG. 2, the extension of the second connecting link 30 is approximately parallel to the extension 50 of the first scissor link 8. When moving the first connecting link 18 further in a clockwise direction, the angle γ would decrease and the second connecting link 30 will be over locked. The dimensional relation of all links in FIG. 2 is dimensioned in a way that the trailing edge 42 of the flap 28 is approximately at the same height as a local wing chord 54, while an angle α between a local flap chord 56 and the wing 6 is approximately 117°. This is considered an intermediate position. Here, a gap 58 between the trailing edge 42 of the flap 28 and the leading edge 60 of the wing 6 is equal to 2% of the local wing chord at a maximum.

Figure 3:
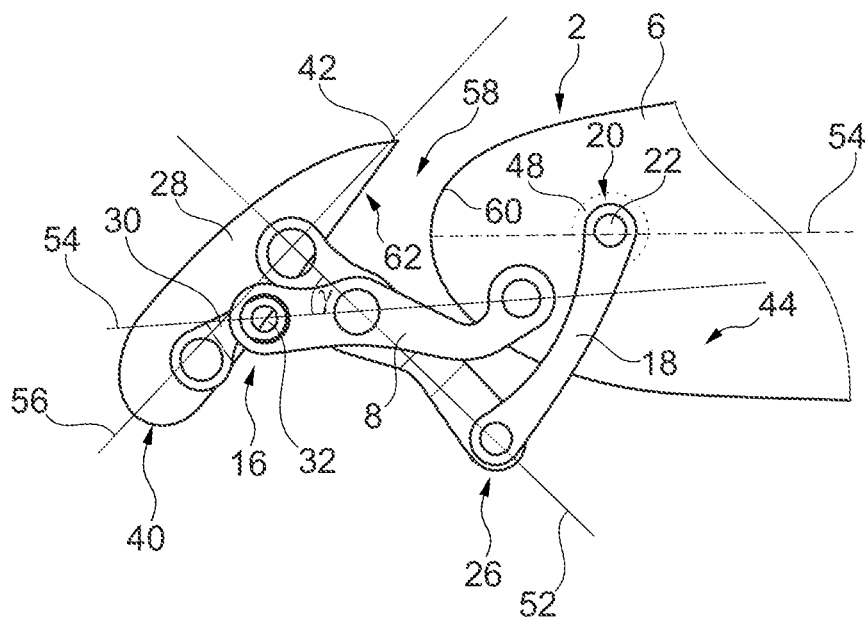
FIG. 3 shows a flap system according to the invention in an extended state at a leading edge of a wing in a schematic lateral view.

FIG. 3 demonstrates that with further motion of the first connecting link 18, the angle γ decreases and thereby the second connecting link 30 swivels around the outer end of the first scissor link 8, which leads to a substantially translational motion of the leading-edge flap 28 further upwards under maintaining a gap 58 between a leading edge 60 of the wing 6 and an underside 62 of the flap 28. The angle α between the local flap chord 56 and the wing 6 is approximately 130° in this position, which is considered the extended position. Thus, a simple mechanism is able to provide a very advantageous motion of the flap 28 by providing a rather large angle between the local flap chord 56 and the local wing chord 54 and the flap 28 already at an intermediate state of the extension motion and maintains the gap 58 between the intermediate and extended positions, which improves the flow and prevents a flow separation on the upper side of the wing 6.

Figure 4:
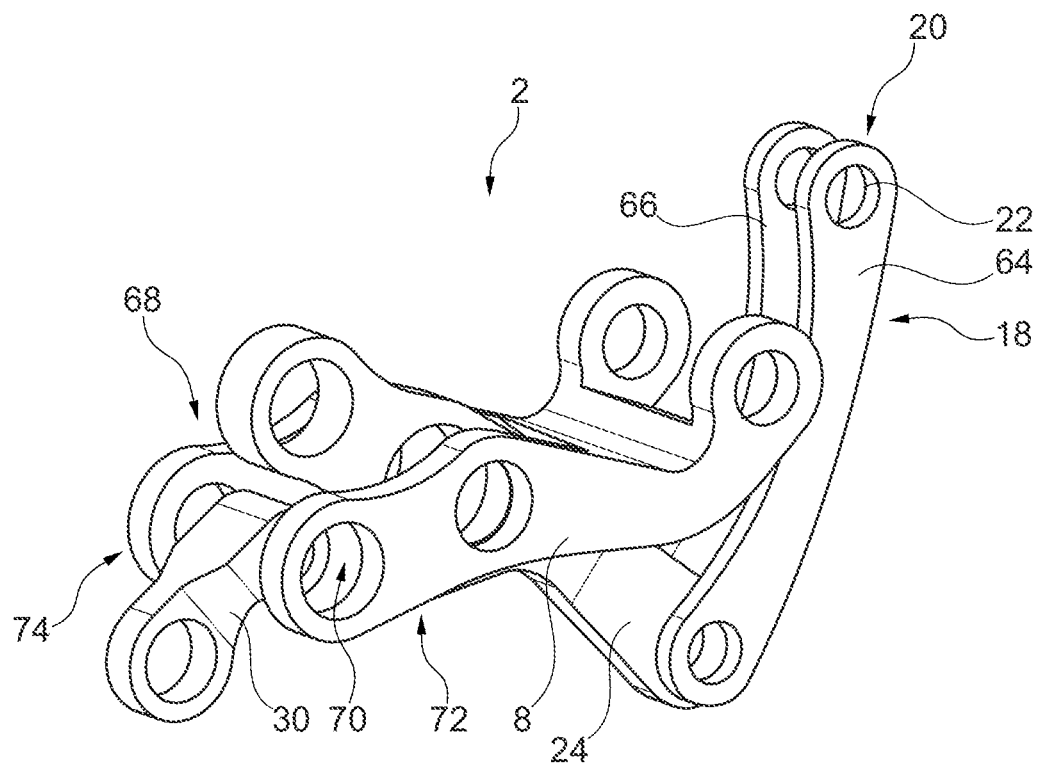
FIG. 4 shows a flap system according to the invention in an extended state at a leading edge of a wing in a three-dimensional view.

FIG. 4 demonstrates the design of the flap system 2 in a three-dimensional view. Here it is apparent that the first connecting link 18 may comprise two individual sublinks 64 and 66, which together create the first connecting link. The first scissor link 8 is designed as a fork head 68 at its outer end 16, thereby creating a recess 70, through which the second scissor link 24 extends. Also, the second connecting link 30 fits between two limbs 72 and 74 of the first scissor link 8. Thereby, a symmetric arrangement of links is provided, which eliminates canting or constraint stresses, etc.

Figure 5:
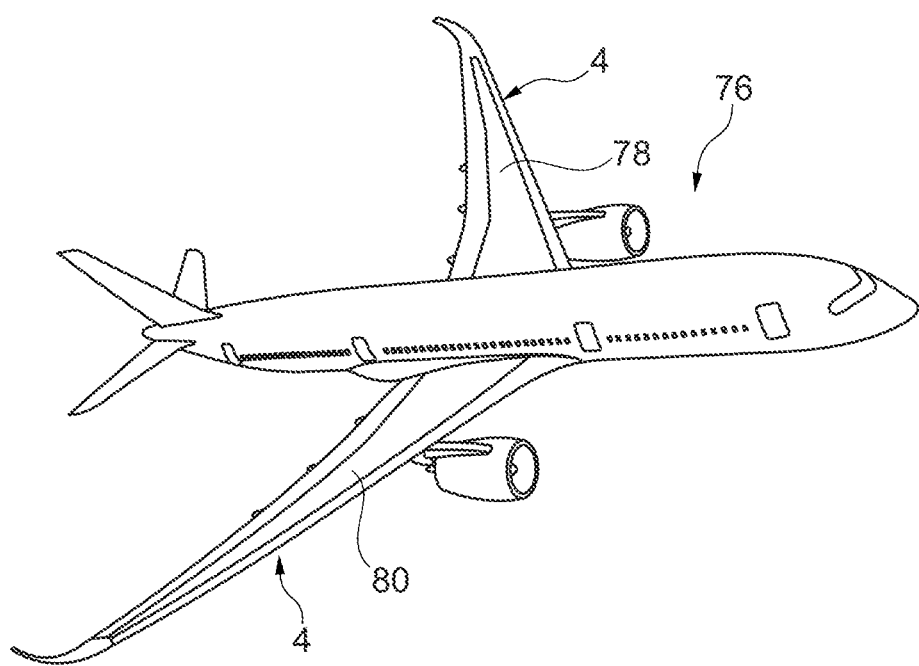
FIG. 5 shows an aircraft having wings comprising at least one flap system according to the invention.

Finally, FIG. 5 shows an aircraft 76 having two wings 78 and 80, to which such a flap system 2 may be installed at leading edge regions 4.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flap system for driving a leading-edge flap between a retracted position and an extended position, the system comprising:
   a leading-edge flap having a first flap joint and a second flap joint,
   a first scissor link,
   a second scissor link,
   a first connecting link, and
   an actuator,
   wherein the actuator is coupled with either the first scissor link or the first connecting link,
   wherein the first scissor link comprises a first support joint for rotatably supporting the first scissor link on a first structurally fixed point, wherein an end of the first scissor link opposed to the first support joint is coupled with the first flap joint,
   wherein the first connecting link comprises a second support joint for rotatably supporting the first connecting link on a second structurally fixed point and wherein an end of the first connecting link opposed to the second support joint is rotatably coupled with an end of the second scissor link,
   wherein an end of the second scissor link opposed to the end coupled with the first connecting link is coupled with the second flap joint,
   wherein additionally the first scissor link and the second scissor link are rotatably coupled to each other to form a scissor arrangement, and
   wherein the actuator, the first scissor link, the second scissor link and the first connecting link are arranged to actively place the leading-edge flap from the retracted position into the extended position,
   wherein the first scissor link is coupled to the flap through a second connecting link, which is rotatably supported to the first scissor link via a coupling and rotatably supported to the first flap joint, the first scissors link having a first extension line extending between an axis of the first support joint and an axis of the coupling and the second connecting link having a second extension line extending between the axis of the coupling and an axis of the first flap joint,
   wherein, in the retracted position of the leading-edge flap, a first angle between the first extension line and the second extension line is less than 180°, in an intermediate position of the leading-edge flap, the first angle between the first extension line and the second extension line is approximately 180° and in the extended position of the leading-edge flap, the first angle between the first extension line and the second extension line is greater than 180°, placing the second connecting link into an over locked position.

2. The system of claim 1, wherein the second connecting link has a shorter length than the first connecting link.

3. The system of claim 2, wherein the second connecting link has a length less than a third of the length of the first connecting link.

4. The system of claim 1,
   wherein one of the first scissor link and the second scissor link comprises a recess along a main extension direction through which the other one of the first scissor link and the second scissor link passes, and
   wherein the first scissor link and the second scissor link are rotatably coupled in a region of the recess.

5. The system of claim 1,
   wherein the first scissor link and the second scissor link comprise a rotary scissor joint for coupling the first scissor link and the second scissor link,
   wherein the scissor joint is placed in a central region of each scissor link.

6. The system of claim 1, wherein the second scissor link is directly coupled with the flap.

7. The system of claim 1, wherein only a single actuator is used.

8. A flap system for driving a leading-edge flap between a retracted position and an extended position, the system comprising:
   a leading-edge flap having a first flap joint and a second flap joint,
   a first scissor link,
   a second scissor link,
   a first connecting link, and
   an actuator,
   wherein the actuator is coupled with either the first scissor link or the first connecting link,
   wherein the first scissor link comprises a first support joint for rotatably supporting the first scissor link on a first structurally fixed point, wherein an end of the first scissor link opposed to the first support joint is coupled with the first flap joint,
   wherein the first connecting link comprises a second support joint for rotatably supporting the first connecting link on a second structurally fixed point and wherein an end of the first connecting link opposed to the second support joint is rotatably coupled with an end of the second scissor link, wherein an end of the second scissor link opposed to the end coupled with the first connecting link is coupled with the second flap joint, wherein additionally the first scissor link and the second scissor link are rotatably coupled to each other at a scissor joint to form a scissor arrangement, wherein the first scissor link and the second scissor link swivably support each other at the scissor joint, wherein the actuator, the first scissor link, the second scissor link and the first connecting link are arranged to actively place the leading-edge flap from the retracted position into the extended position, and wherein the actuator, the first scissor link, the second scissor link and the first connecting link are configured and arranged to actively place the leading-edge flap from the retracted position into an intermediate position, in which a chord axis of the flap is adjusted to a desired angle relative to a local chord axis of a wing, and to provide a translational motion afterwards along the chord axis of the flap moving the leading-edge flap into the extended position, in which the angle of the chord axis of the flap relative to the local chord axis of the wing is increased in a range of 10° to 15°.

9. The system of claim, 8, wherein the actuator, the first scissor link, the second scissor link and the first connecting link are configured and arranged to actively place the leading-edge flap from the retracted position into the intermediate position, in which the chord axis of the flap is adjusted to the desired angle relative to the local cord axis of the wing, while the leading-edge flap remains below the local cord axis of the wing, and to provide a translational motion afterwards along the chord axis of the flap moving the leading-edge flap into the extended position at least partially above the local cord axis of the wing.

10. The system of claim 8, further comprising a second connecting link having a shorter length than the first connecting link.

11. The system of claim 10, wherein the second connecting link has a length less than a third of the length of the first connecting link.

12. The system of claim 8,
wherein one of the first scissor link and the second scissor link comprises a recess along a main extension direction through which the other one of the first scissor link and the second scissor link passes, and
wherein the first scissor link and the second scissor link are rotatably coupled in a region of the recess.

13. The system of claim 8,
wherein the first scissor link and the second scissor link comprise a rotary scissor joint for coupling the first scissor link and the second scissor link,
wherein the scissor joint is placed in a central region of each scissor link.

14. The system of claim 8, wherein the second scissor link is directly coupled with the flap.

15. A flap system for driving a leading-edge flap between a retracted position and an extended position, the system comprising:

a leading-edge flap having a first flap joint and a second flap joint,
a first scissor link,
a second scissor link,
a first connecting link, and
an actuator,
wherein the actuator is coupled with either the first scissor link or the first connecting link,
wherein the first scissor link comprises a first support joint for rotatably supporting the first scissor link on a first structurally fixed point, wherein an end of the first scissor link opposed to the first support joint is coupled with the first flap joint,
wherein the first connecting link comprises a second support joint for rotatably supporting the first connecting link on a second structurally fixed point and wherein an end of the first connecting link opposed to the second support joint is rotatably coupled with an end of the second scissor link,
wherein an end of the second scissor link opposed to the end coupled with the first connecting link is coupled with the second flap joint,
wherein additionally the first scissor link and the second scissor link are rotatably coupled to each other at a scissor joint to form a scissor arrangement, wherein the first scissor link and the second scissor link swivably support each other at the scissor joint,
wherein the actuator, the first scissor link, the second scissor link and the first connecting link are arranged to actively place the leading-edge flap from the retracted position into the extended position, and
wherein the actuator, the first scissor link, the second scissor link and the first connecting link are configured and arranged to actively place the leading-edge flap from the retracted position into an intermediate position, in which the leading-edge flap is positioned completely ahead of a leading edge of the wing, but below a local cord axis of the wing, with a gap between a rear edge of the leading-edge flap and the leading edge of the wing, and from the intermediate position into the extended position, in which the leading-edge flap is positioned completely ahead of the leading edge of the wing, and at least partially above the local cord axis of the wing, and retaining the gap between the rear edge of the leading-edge flap and the leading edge of the wing.

16. A wing having a leading-edge region and a trailing edge region, as well as at least one system according to claim 1 installed inside the wing.

17. The wing according to claim 16, wherein the system is arranged in the leading-edge region.

18. The wing according to claim 16, wherein the system is configured to move the flap below a wing leading edge point up to an angle of 117° between a local flap chord and a local wing chord.

19. The wing according to claim 16, wherein the flap system is further designed to limit a gap between a trailing edge of the flap and a leading-edge point of the wing to 2% of a local wing chord.

20. An aircraft having at least one wing according to claim 16.

* * * * *